No. 894,223.
PATENTED JULY 28, 1908.
S. NELSEN.
LINK FOR CONNECTING CHAINS.
APPLICATION FILED SEPT. 25, 1907.
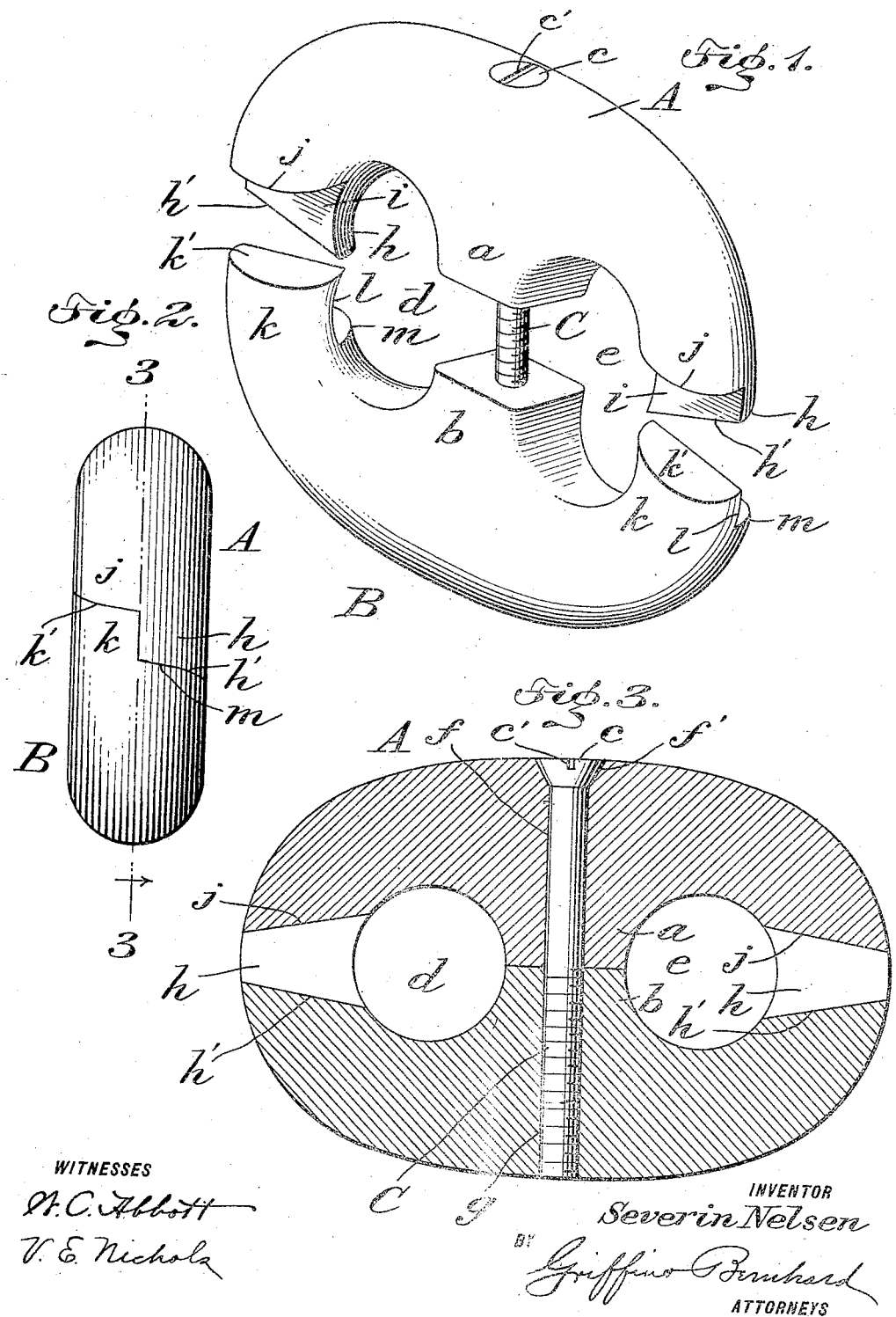
WITNESSES
H. C. Abbott
V. E. Nichols
INVENTOR
Severin Nelsen
BY Griffin Bernhard
ATTORNEYS

UNITED STATES PATENT OFFICE.

SEVERIN NELSEN, OF NEW YORK, N. Y.

LINK FOR CONNECTING CHAINS.

No. 894,223.          Specification of Letters Patent.          Patented July 28, 1908.

Application filed September 25, 1907. Serial No. 394,567.

*To all whom it may concern:*

Be it known that I, SEVERIN NELSEN, a subject of the King of Norway, residing in the city of New York, borough of Brooklyn, in the county of Kings and State of New York, have invented a certain new and useful Link for Connecting Chains, of which the following is a specification.

This invention is a link to be used primarily for connecting chains, such as anchor chains used on ship board, although it is to be understood that the new link may be used in other places, and for a variety of other purposes.

One object of the invention is to enable the link to be opened easily and quickly for the purpose of placing one or more other chain links in the eyes of said new link, whereby the chains may be coupled quickly and securely.

Another object is to construct the end portions of the new divided separable link in such a way as to retain, practically, the full strength of the metal, at the places where the strain or pull of the chains is exerted on the link of this invention.

My new link is simple and strong in construction, and it can be manufactured economically. Said links consist of three parts only, *i. e.* two members and a screw or bolt. Each member has an integral projection internally thereof, said projection of the two members being assembled in abutting relation, whereby the cross bar of the link is formed and provision is made for the reception of the bolt or screw.

An important feature of the link consists of an overlapping-joint at each end thereof, each member having at each of said ends a flange or lip and a shoulder, the edges of which are oppositely inclined. The flanges or lips overlap each other in the plane of the axis of the link, and the shoulders engage on inclined lines so as to limit the tendency of the members to slide lengthwise and, also, to distribute the strain equally upon the overlapping end portion of the link.

In the accompanying drawing, I have illustrated one practical embodiment of the invention, but the construction shown therein is to be understood as illustrative only and not as defining the limits of the invention.

Figure 1 is a perspective view of my new separable link representing the parts in position for assemblage. Fig. 2 is a view in end elevation. Fig. 3 is a longitudinal section on the line 3—3 of Fig. 2.

My new link consists of the members, A, B, and the screw bolt, C. The link is of the usual shape, with rounded end portions, and it may be constructed of any suitable size or dimensions.

The form of link shown in the drawing is of that class known as double-eye links, and in order to produce the two eyes, $d$, $e$, the link is provided with a substantially central cross bar, which in the separable link is composed of the projections, $a$, $b$. The projection, $a$, is integral with the member, A, and it is provided with a flat inner face. The other projection, $b$, is integral with the member, B, and it is likewise provided with a flat inner face, which is adapted to engage with the face of the projection, $a$, the line of engagement between the meeting faces of the two projections being in the plane of the longitudinal transverse axis of the link.

The members, A, B, are provided in their solid middle portions with openings, $f$, $g$, respectively, which openings extend through the projections, $a$, $b$. The opening, $g$, in one of the members, preferably the member, B, is internally threaded, see Fig. 3.

The bolt, C, is provided with a head, $c$, having a nick, $c'$, and this bolt is adapted to pass through the opening, $f$, of the member, A, and into the opening, $g$, of the member, B, whereby the threaded part of the bolt engages with the threads of said opening, $g$. It is evident that the opening, $g$, need not extend entirely through the member, B, and thus the inner end of the bolt is adapted to be received in a socket of said member, B. It is preferred to flare the opening, $f$, in the member, A, as indicated at $f''$ in Fig. 3, whereby the head, $c$, of the bolt, C, may be countersunk so as to lie flush with the outer surface of the member, A.

At each end the link is peculiarly formed so as to produce overlapping portions forming a lap joint, the surfaces of which are inclined longitudinally of the link. The member, A, is provided at each end with a flange or lip, $h$, and a recess, $i$, adapted to form a shoulder, $j$. The edge, $h'$, of the flange or lip, $h$, is beveled or inclined in one direction, whereas the edge of the shoulder, $j$, is beveled or inclined in an opposite direction to the aforesaid inclined edge, $h'$. At the same end of the link the member, B, is formed with a flange or lip, k, a recess, l, and a shoulder, m. The edge, k', of the flange or lip, k, is inclined lengthwise of the link in one direction, whereas the face of the shoulder, m, is inclined lengthwise of the link in an opposite direction. The inclination of the shoulder, m, of the member, B, corresponds to the inclination, h', of the flange or lip, h, of the member, A, and similarly the inclination of the edge, k', of the flange or lip, k, forming a part of the member, B, is in the same direction as the inclination of the face on the shoulder, j, of the member, A. When assembling the members, A, B, the flanges or lips, h, h', are placed opposite to the recesses, i, l, and the members are moved toward each other so that the flanges or lips, k, h, will overlap each other sidewise. This brings the face, k', in engagement with the shoulder, j, and the edge, h', in engagement with the shoulder, m. At the same time the flat inner faces of the projections, a, b, engage one with the other, and, the openings, f, g, being in register, the bolt, C, can be inserted and screwed into the member, B, whereby the members are fastened together detachably and securely.

By reference to Fig. 3 it will be noted that the eyes, d, e, are separated by the cross bar at the middle of the link, said cross bar being formed by the meeting or abutting projections, a, b, which projections receive the fastening screw or bolt, C. Furthermore, each end portion of the link is formed by the overlapping flanges or lips, h, k, of the members, and these flanges or lips are beveled so as to distribute the strain uniformly on the members, said strain being imposed on the link by the pull of a chain.

The bolt, C, can be removed quickly for the purpose of separating the members, A, B, thus enabling other links to be placed readily in the eyes, d, e, of the separable link, the members of which are reassembled and secured by the re-insertion of the bolt, C. The inserted links contained in the eyes, d, e, pull on the ends of the separable link, and not on the middle cross bar thereof, thus relieving the bolt, C, from strain. The pull of the inserted link is on the overlapping flanges or lips, h, k, of the members. As said flanges or lips at each end are inclined oppositely to each other, and as the flanges or lips at one end are inclined oppositely to the flanges or lips at the other end, (see Fig. 3), it follows that the strain is distributed uniformly on the members, A, B, which are clamped solidly together by the bolt, C.

The flanges or lips, h, k, at each end of the link overlap so as to preclude sidewise movement of the members, and the longitudinally inclined flanges or lips at the respective ends of the clamped members preclude any possibility of longitudinal displacement, and, consequently, obviate a shearing strain on the fastening bolt.

Having thus fully described the invention, what I claim as new, and desire to secure by Letters Patent is:

1. A separable link comprising matching members, each member being cut away transversely thereof to produce a flange and a shoulder, the faces of which are inclined oppositely to each other, said members being assembled for the flange of one member to have abutting engagement with the shoulder of the other member, said flanges of the members overlapping each other.

2. A separable link comprising complemental members each having at one end a flange and a shoulder adjacent to said flange, whereby the shoulders and flanges of said members may be assembled in abutting and lapping engagement, the abutting faces of the flanges and shoulders on each member being inclined oppositely to each other.

3. A separable link comprising members each of which is cut away at the respective ends thereof to produce at each end a shoulder and a flange projecting from said shoulder, the abutting face of the flange and the similar face of the shoulder on each member being inclined oppositely to each other, the said faces of the flanges and the shoulders at the opposite ends of each link member being inclined reversely to each other.

4. A separable link divided transversely in the plane of the longitudinal axis of said link, thereby producing complemental members which are provided with abutting faces at their end portions only, said meeting faces at one end of the link being inclined oppositely to the corresponding faces at the other end of the link.

In testimony whereof I have signed my name to this specification in the presence of two subscribing witnesses.

SEVERIN NELSEN.

Witnesses:
 JAS. H. GRIFFIN,
 H. I. BERNHARD.